United States Patent [19]
Rintz

[11] Patent Number: 5,811,729
[45] Date of Patent: Sep. 22, 1998

[54] LIGHT SWITCH COVER

[76] Inventor: William J. Rintz, 819 NE. 1st Ct., Delray Beach, Fla. 33483

[21] Appl. No.: 640,538

[22] Filed: May 2, 1996

[51] Int. Cl.$^6$ ..................................................... H05K 5/03
[52] U.S. Cl. .......................... 174/66; 220/241; 200/302.3
[58] Field of Search ........................ 174/66, 67; 220/241, 220/242; D8/353; D13/177; 200/302.3, 333, 302.1, 317, 310

[56] References Cited

U.S. PATENT DOCUMENTS

| | | | |
|---|---|---|---|
| 1,797,635 | 3/1931 | Buchsbaum | 220/241 |
| 2,984,725 | 5/1961 | Hubbell et al. | 200/168 |
| 3,028,467 | 4/1962 | Hubbell | 174/66 X |
| 3,188,438 | 6/1965 | Lovasco | 200/302.3 X |
| 3,663,781 | 5/1972 | Zimmerman | 200/172 R |
| 3,680,237 | 8/1972 | Finnerty, Sr. | 40/130 M |
| 4,004,120 | 1/1977 | Lee | 200/310 |
| 4,009,797 | 3/1977 | Lee | 200/242 |
| 4,488,024 | 12/1984 | Colgate | 200/330 |
| 4,733,330 | 3/1988 | Tanaka et al. | 174/66 X |
| 4,757,168 | 7/1988 | Fujiyoshi et al. | 200/330 X |
| 4,760,227 | 7/1988 | Boxer | 200/330 |
| 5,221,814 | 6/1993 | Colbaugh et al. | 174/66 |
| 5,379,912 | 1/1995 | Wolf | 220/241 X |
| 5,448,028 | 9/1995 | Filion et al. | 200/302.1 |
| 5,457,286 | 10/1995 | Flasz | 174/66 |
| 5,577,602 | 11/1996 | Conner et al. | 174/66 X |

FOREIGN PATENT DOCUMENTS

| | | | |
|---|---|---|---|
| 1238412 | 9/1989 | Japan | 174/66 X |
| 1363425 | 8/1974 | United Kingdom | 174/66 X |

OTHER PUBLICATIONS

"Modern Plastics" magazine, Oct. 1948, p. 89.
MetroMark brochure (® 1996 MetroMark Inc.).

*Primary Examiner*—Kristine L. Kincaid
*Assistant Examiner*—Dean A. Reichard
*Attorney, Agent, or Firm*—Malin, Haley, DiMaggio & Crosby, PA

[57] ABSTRACT

A light switch cover is disclosed for use with a conventional "rocker" type switch. The cover generally includes a mounting bracket which is attached to the electrical box, along with the "rocker" switch and a face plate which is attached to the mounting bracket. The face plate is preferably constructed from a soft material, to allow the user to operate the covered "rocker" switch. Preferably, the outer surface of the face plate is provided with a decorated design or other indicia. The light switch can also be utilized where more than one "rocker" switch is provided. In these cases, a diverter bar is provided on the mounting bracket, to absorb pressure being asserted on one "rocker" switch from also transferring to an adjacent "rocker" switch and inadvertently turning "off" or "on" the adjacent "rocker" switch. An electroluminescent lighting sheet can also be provided between the face plate and mounting bracket to highlight and enhance the decorative features of the present invention light switch cover.

15 Claims, 5 Drawing Sheets

Fig. 1

LIGHT SWITCH COVER

BACKGROUND OF THE INVENTION

1. Field of the Invention

This invention relates generally to light switch covers and receptacle covers particularly to a combination decorative light switch cover and mounting bracket for use with "rocker" type light switches.

2. Description of the Prior Art

Rigid light switch covers have been utilized in the past for safety means. Three disadvantages associated with the use of rigid light switch covers are (1) inoperability of covered light switch; (2) unattractiveness of the cover; and (3) difficulties in attaching the rigid light switch cover. To utilize the covered switch, the user must each time remove the cover. Conventional light switch covers have not been use in the past as a decorative element, but merely for safety purposes.

Some examples of previous cover devices include: U.S. Pat. No. 4,760,227 issued to Boxer (the "Boxer" device); U.S. Pat. No. 4,757,168 issued to Fujiyoshi et al (the "Fujiyoshi" device); U.S. Pat. No. 5,457,286 issued to Flasz (the "Flasz" device); and U.S. Pat. No. 4,488,024 issued to Colgate (the "Colgate" device).

The Boxer device provides a sliding switch cover assembly which comprises a switch plate on which a toggle actuator is mounted by two sets of vertically aligned pins extending from the switch plate. Vertical slots are provided in the actuator in alignment with the two sets of vertically aligned pins. The toggle switch is turned off and on by the actuator plate which slides up and down the vertically aligned pins.

The Fujiyoshi device provides a switch device comprising a mounting frame having a switch body. The switch is designed to be attachable or detachable from a switch working portion.

The Flasz device provides a face plate assembly which is secured over an electrical switch or output source. The assembly includes a frame structure having at least one opening in a flat central area which surrounds an electricity controlled casing. A plurality of key plates are provided, with one key plate being positioned so that it can pivot.

The Colgate device provides wall switch cover and actuator which is used with a standard wall toggle switch. The cover and actuator comprise a frame which is held in position on the switch and the switch cover plate. The switch actuator is held within the frame, and portions of the switch actuator abut opposite sides of the toggle switch. A cover is also mounted on the frame over the switch actuator.

In new construction, "rocker" type light switches have virtually replaced previously used "toggle" type light switches. Thus, what is needed in the art is a light switch cover, which (1) can be utilized with "rocker" type light switches; (2) completely cover the underneath light switch; (3) provide a decorative element which adds artistic value to the room; and (4) provides an easy attachment method for attaching the cover. It is therefore, to the effective resolution of the aforementioned problems and shortcomings of the prior art that the present invention is directed.

SUMMARY OF THE INVENTION

The present invention provides a light switch cover which is preferably, utilized with a conventional "rocker" type switch. The cover includes a mounting bracket which is attached to the electrical box, along with the "rocker" switch and a face plate which is attached to the mounting bracket. The face plate is preferably constructed from a soft material, to allow the user to operate the covered "rocker" switch. Preferably, the outer surface of the face plate is provided with a decorated design, logo, picture, photograph, wording, indicia, or any other decorative, informational or promotional indicia.

The present invention can also be utilized where more than one "rocker" switch is provided. In these cases, a diverter bar is provided on the mounting bracket, to absorb pressure being asserted on one "rocker" switch from also transferring to an adjacent "rocker" switch and inadvertently turning "off" or "on" the adjacent "rocker" switch.

Additionally, an electroluminescent lighting sheet can also be provided between the face plate and mounting bracket to highlight and enhance the decorative features of the present invention light switch cover. The lighting sheet receives power via associated wires that are connected to the conventional "rocker" switch box.

Accordingly, it is an object of the present invention to provide a light switch cover and mounting bracket for use in conjunction with a rocker switch.

It is another object of the present invention to provide a light switch cover that fully shields the rocker switch and receptacle from external access for safety purposes.

It is a further object of the present invention to provide a light switch cover made of flexible materials to allow the covered rocker switch to be operable.

It is still another object of the present invention to provide a light switch cover which provides aesthetic features.

It is yet another object of the present invention to provide a light switch cover which will illuminate when the rocker switch is in an "off" position.

In accordance with these and other objects which will become apparent hereinafter, the instant invention will now be described with particular reference to the accompanying drawings.

BRIEF DESCRIPTION OF THE DRAWINGS

This invention may be better understood by reference to the drawings in which.

DESCRIPTION OF THE PREFERRED EMBODIMENTS

As seen in FIGS. 1 through 4, a first embodiment of the present invention light switch cover is shown and generally designated as reference numeral 15. Cover 15 generally consists of a face plate 20 and a mounting bracket 36.

Figure 1:
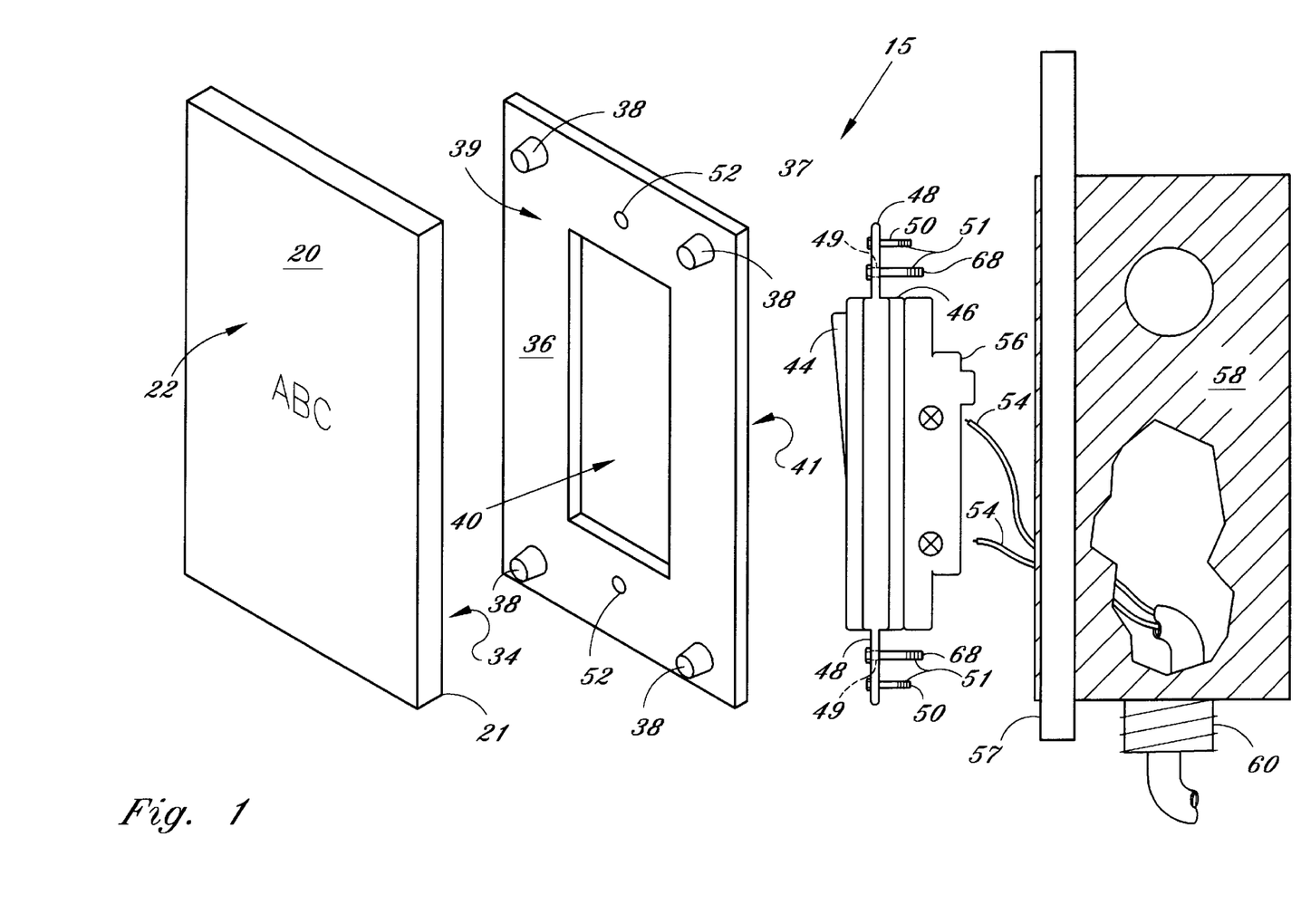
FIG. 1 illustrates an exploded view of a first embodiment for the light switch cover in accordance with the present invention.
Figure 2:
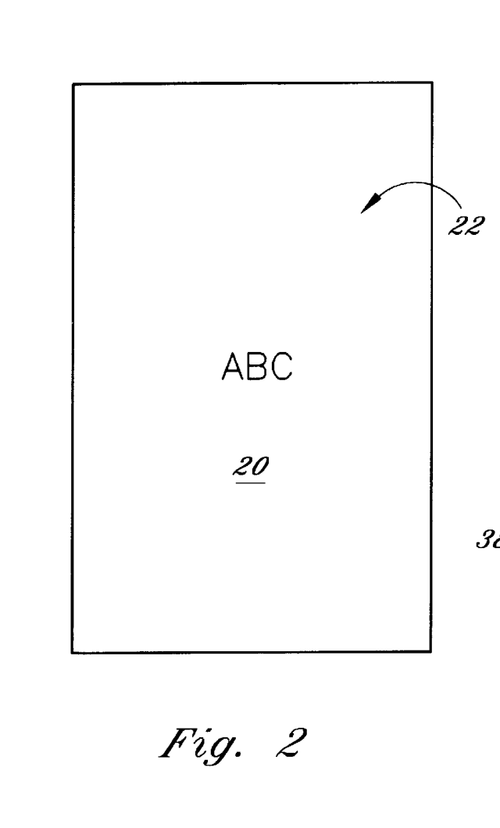
FIG. 2 illustrates a front view of the face plate member of the light switch cover shown in FIG. 1.
Figure 4:
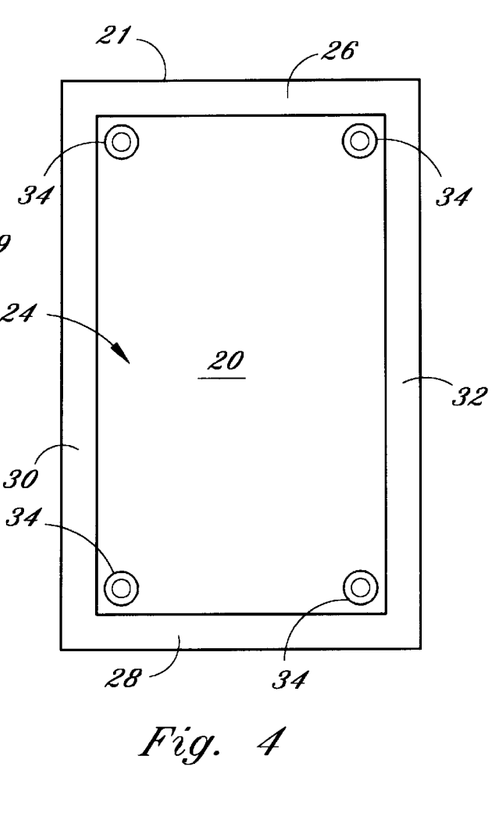
FIG. 4 illustrates a back view of the face plate member shown in FIG. 1.

Face plate 20 consists of a body member 21 having an outer surface 22 and inner surface 24. A top lip 26, a bottom lip 28, a first side lip 30, and a second side lip 32 can be provided and are preferably, constructed integral to respective edge portions of body member 21. Face plate 20 is preferably constructed from a castable, soft, flexible material such as neoprene, silicone, vinyl, etc., to allow a conventional rocker switch 46 to be operated while face plate 20 is disposed over rocker switch 46 for safety purposes. Though not preferred, face plate 20 can also be constructed from a rigid plastic or the like. However, with the rigid material, the user cannot utilize covered rocker switch 46. Outer surface 22 can be provided with any type of decorative design or indicia. Outer surface 22 can also be provided with a hand carved design, such as replicas of famous art. Additionally, a screen print design can be directly applied to face plate 20. As such, a plurality of interchangeable face plates 20 each having a different decorative design can be provided depending on the mood of the user.

A plurality of female receiving ports 34 are provided on inner surface 24 of body member 21 for receipt of respective dowel or peg members 38 associated with mounting bracket 36, discussed in detail below. Preferably, four ports 34 and pegs 38 are provided. However, such is not limiting and a different number of ports 34 and pegs 38 can be utilized and is considered within the scope of the present invention.

Figure 3:
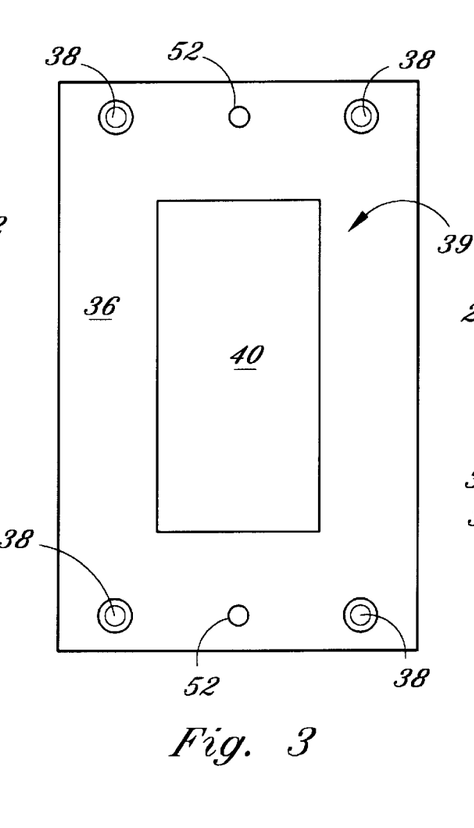
FIG. 3 illustrates a front view of the mounting bracket member of the light switch cover shown in FIG. 1.

Mounting bracket 36 includes a body member 37 having an inner surface 39 and an outer surface 41. Mounting bracket 36 can be constructed from a rigid epoxy, rigid plastic, castable plastic, etc. An opening 40 is provided through body member 37 to allow a protruding switch portion 44 of a rocker switch 46 to pass through when mounting bracket 36 is properly attached. As stated above, a plurality of protruding pegs 38 are provided and attached to inner surface 39 of body member 37. Mounting bracket 36 is also provided with preferably two apertures 52 for receipt of mounting screws 50. Preferably, apertures 52 are disposed above and below opening 40, however, other locations for apertures 52 are considered within the scope of the invention.

A wall 57 has embedded therein an electrical box 58 and conduit 60. Conduit 60 houses electrical conducting wires 54. The exposed ends of electrical wires 54 are attached to a switch box 56 by conventional means. Switch box 56 is housed within electrical box 58 by conventional means. Switch box 56 is attached to a back portion of rocker switch 46, as well as being operatively associated with rocker switch 46. Rocker switch 46 is provided with outer flanges 48 preferably at a top and bottom end of rocker switch 46. Flanges 48 are each provided with an aperture 49 for receipt of mounting screws 68 which attach rocker switch 46 to electrical box 58.

The location of apertures 52 in body member 37 are chosen to align with mounting bracket attachment apertures of rocker switch 46 which are preferably disposed above or below apertures 49, to allow a respective mounting screw 50 to be inserted through apertures 52 and mounting bracket attachment aperture for attaching mounting bracket 36 to rocker switch 46 when assembling light switch cover 15. The mounting bracket attachment apertures have been previously provided on rocker switch 46 for attachment of a conventional light face plate.

To assemble light switch cover 15, mounting screws 68 are each inserted in their respective apertures 49 and corresponding conventional screw passageways (not shown) associated with embedded electrical box 58, to attach rocker switch 46 to electrical box 58. Mounting screws 50 are then inserted through respective apertures 52 and mounting bracket attachment apertures for attaching mounting bracket 36 to rocker switch 46. Preferably, all passageways and apertures, described in this paragraph, have interior threads which mate with exterior threads 51 of screws 50 and 68 through use of conventional means such as a regular head or phillips head screwdriver.

Once mounting screws 50 and 68 have been fully turned or inserted within their respective apertures and electrical box passageways, mounting bracket 36 is disposed flush or abutting wall 57 and a light activating portion 44 of rocker switch 46 protrudes out of wall 57 and through opening 40.

When attaching face plate 20 to mounting bracket 36, female ports 34 are aligned with their respective protruding pegs 38, and face plate 20 is moved to allow each port 34 to receive its respective peg 38. The inner diameter of port 34 is slightly larger than the outer diameter of its respective peg 38 to provide a snug and tight fit to provide a secure attachment of face plate 20 to mounting bracket 36. The depth of face plate 20, which is defined by its lip members 26, 28, 30 and 32 is preferably approximately equal to the protruding length of pegs 38 to allow the edges of lip members 26, 28, 30 and 32 to abut wall 57 when face plate 20 is properly attached to mounting bracket 36. As face plate 20 is preferably constructed from a flexible material, rocker switch 46 can still be operated, while face plate 20 provides a safety means, as well as a decorative feature, by fully covering rocker switch 46.

Figure 5:
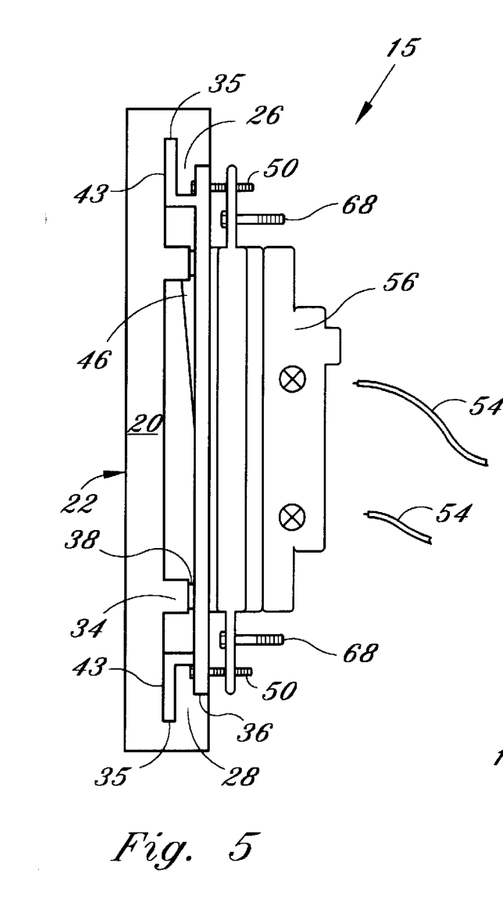
FIG. 5 illustrates a side sectional view of the first embodiment light switch cover.

As an additional safety feature, a second attachment point for face plate 20 to mounting bracket 36 can be provided. As best seen in FIG. 5, lip members 26, 28, 30 and 32 define an inner peripheral groove 35 which mates with a mounting bracket peripheral flange 43 to help prevent face plate 20 from inadvertently being detached from mounting bracket 36. When attaching face plate 20 having a groove 35 to mounting bracket 36 having flange 43, initially the top portion of flange 43 is position within the portion of groove 35 defined by top lip member 26. Next the side portions of flange 43 and positioned within the portions of groove 35 defined by side lip members 30 and 32, while also inserting pegs 38 within the respective receiving ports 34. Lastly the bottom portion of flexible face plate 20 is pulled down by the installer's hands or a small grabbing tool to allow the bottom portion of flange 43 to be inserted within the portion of groove 35 defined by lip member 28.

Once properly disposed, the installer releases the pull on the bottom portion of face plate 20, providing for a very secure and tight fit between face plate 20 and mounting bracket 36. To remove face plate 20, the steps described in the preceding paragraph for attaching face plate 20 are performed in reverse with the installer initially pulling down on the bottom portion of face plate 20 either with his or her hands or by the previously mentioned small grabbing tool, thus causing the bottom portion of flange 43 to no longer be disposed within groove 35.

Once light switch cover 15 is properly attached, a person wishing to position rocker switch 46 in an "off" or "on" position, merely presses on soft face plate 20, which allows the person to also directly press switch 46.

Figure 6:
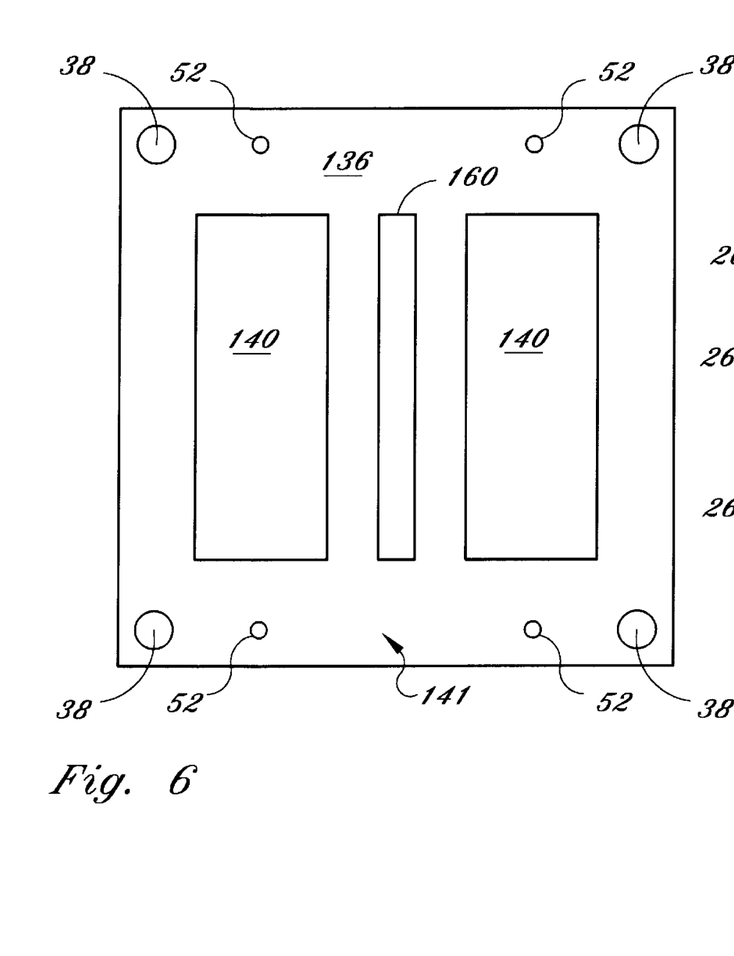
FIG. 6 illustrates a front view of a mounting bracket in accordance with a second embodiment of the present invention.
Figure 7:
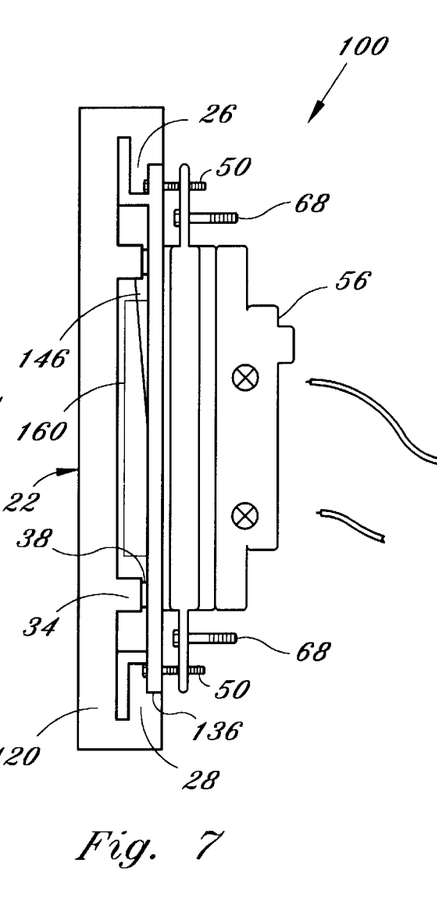
FIG. 7 illustrates a side sectional view of the second embodiment light switch cover.

The teachings of the first embodiment of the present invention can also be utilized when more than one rocker switch 146 is provided. As seen in FIGS. 6 and 7, a second embodiment light switch cover 100 of the present invention is illustrated incorporating a mounting bracket 136 having multiple openings 140 for receiving multiple protruding rocker switches 146. Face plate 120 is attached to mounting bracket 136 similar to the two attachment methods (groove 35/flange 43 and/or ports 34/pegs 38) described above. Face plate 120 can be structured and constructed identical to face plate 20 of the first embodiment, with the exception of face plate 120 being wider in its width in order to cover all of the rocker switches 146 provided.

Mounting bracket 136 is structured similar to mounting bracket 36 with the exception of mounting bracket 136 being wider in its width in order to provide a plurality of openings 140 equal to the number of rocker switches 146 provided. Additionally, mounting bracket 136 is provided with a pressure absorption diverter bar 160 between each opening 140 and protruding outward from outer surface 141. Diverter bar 160 can also be constructed from a rigid epoxy, rigid plastic, castable plastic, etc. Furthermore, diverter bar 160 can be constructed integral with mounting bracket 136 or attached thereto by conventional means such as adhesives, hook and loop fasteners, tape, etc.

Diverter bar 160 protrudes outward at least slightly further than the rocker switches 146 which are adjacent each side of diverter bar 160. Preferably, diverter bar 160 does not protrude as far outward as pegs 38 so not to interfere with the attachment of face plate 120 to mounting bracket 136 by the insertion of pegs 38 within female receiving ports 34.

Diverter bar 160 allows for the on or off operation of a singular rocker switch 146 without affecting the other rocker switches. Thus, pressure bar 160 absorbs pressure placed on face plate 120 so that only the intended switch is turned either on or off as desired.. Though not shown, it is to be understood that a diverter bar 160 can be provided on mounting bracket 146 between each pair of rocker switches 146 where more than two rocker switches are provided.

Figure 8:
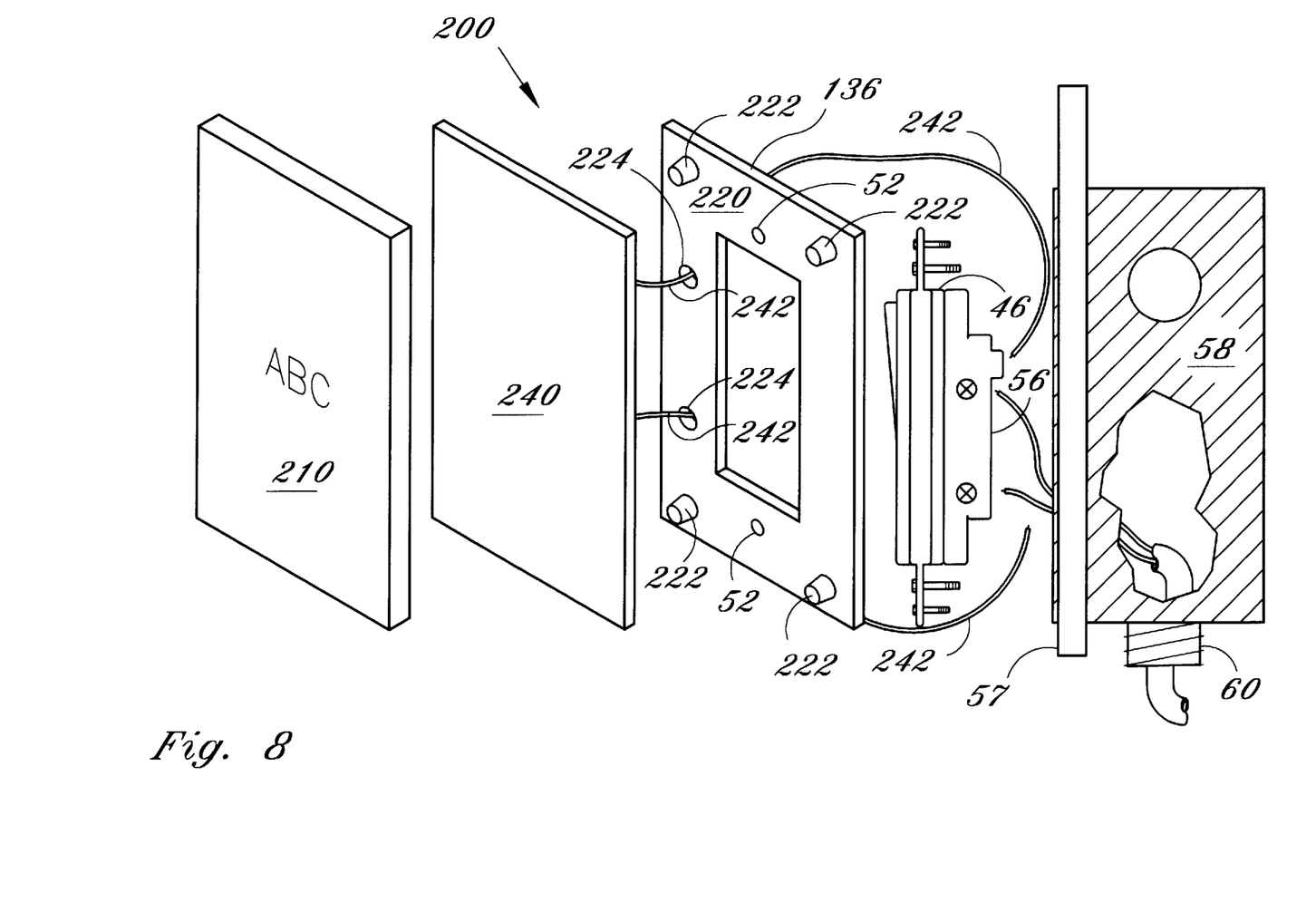
FIG. 8 illustrates an exploded view of a third embodiment light switch cover in accordance with the present invention.
Figure 9:
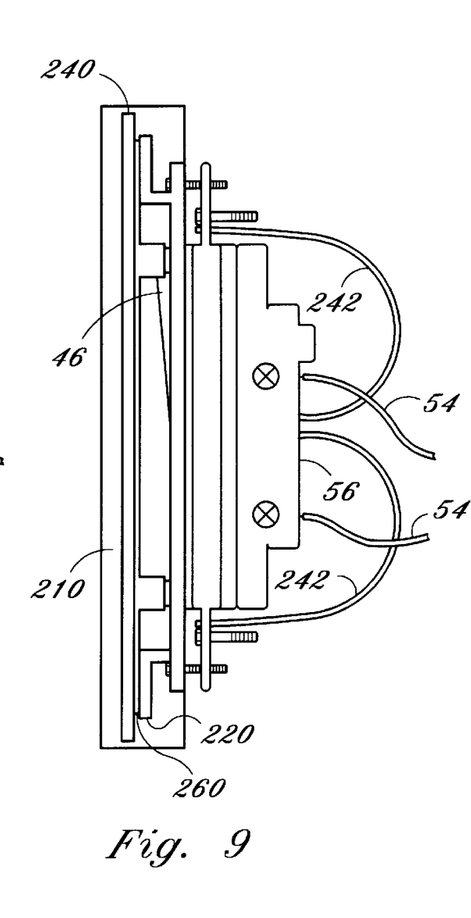
FIG. 9 illustrates a side sectional view of the third embodiment light switch cover.
Figure 10:
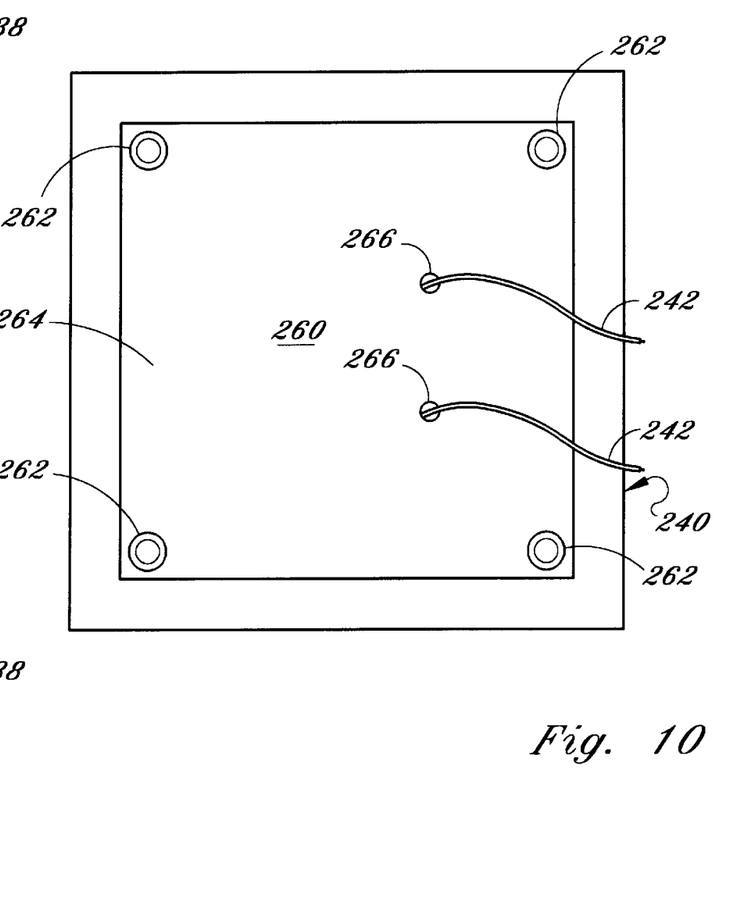
FIG. 10 illustrates a perspective back view of an attachment sheet in accordance with the third embodiment light switch cover.

FIGS. 8 through 10 illustrate a third embodiment of the present invention wherein the light switch cover is generally designated as reference numeral 200. In this embodiment, light switch cover 200 is generally provided with a face plate 210, mounting bracket 220, and electroluminescent lighting sheet or panel 240.

Electroluminescent lighting sheet 240 highlights or enhances a design disposed on an outer surface of face plate 210, or itself can be a lighting effect design in lieu of a design on the outer surface of face plate 210. Additionally, a screen print design can be directly applied to lighting sheet 240, as well as face plate 210. Where, a screen print design is applied to lighting sheet 240, face plate 210 can merely be a clear cover. Lighting sheet 240 can provide cool, bright, uniform panels of light which can create a combination of various colors of light or a single color depending on the user's preference. Lighting sheet 240 can also be constructed to provide light patterns in an endless amount of shape configurations. Lighting sheet 240 will not delaminate in use and the tiny lamps associated with sheet 240 are highly resistant to moisture and humidity. Lighting sheet 240 provides a cool light so not to affect face plate 210.

Lighting sheet 240 can be disposed between the female receiving ports of face plate 210. Lighting sheet 240 includes a pair of wires 242 which are conventionally connected to switch box 56 to energize lighting sheet 240. Wires 242 are fed from lighting sheet 240 through apertures 224 of mounting bracket 220 to switch box 56. To provide a larger lighting sheet 240, the female ports associated with face plate 210 can be disposed on the back surface of lighting sheet 240, allowing lighting sheet 240 to be snugly inserted in the area defined by the lip members of face plate 210.

Furthermore, in lieu of providing the female ports on lighting sheet 240 (which would mate with protruding pegs 222), an additional attachment sheet 260 (FIG. 10), having female ports 262 on its outer surface 264 can be provided. Attachment sheet 260, as well as lighting sheet 240, are constructed from a soft material, in order to operate covered rocker switch 46. Attachment sheet 260 is provided with apertures 266 for feeding therethrough of wire 242 coming from lighting sheet 240.

Face plate 210 can have a lip member, defining a mating groove, extending around it periphery, similar to the lip member of face plate 20 (FIG. 1). Alternatively, in lieu of face plate 210 having lip members, attachment sheet 260 can be provided with lip members around its periphery which define a groove for mating with the outer flange member of the bracket member.

Lighting sheet 240 is sandwiched between face plate 210 and attachment sheet 260, and attachment sheet 260 is attached to face plate 210 by conventional means such as silicone. Once attachment sheet 260 is attached, wires 242 protrude out of apertures 266 and female ports 262 mate with protruding peg members 222 of mounting bracket 220. Prior to attaching mounting bracket 220 to electrical box 58, wires 242 are routed through apertures 224 of mounting bracket 220 and connected to switch box 56. Once wires 242 are properly attached, mounting bracket 220 is attached to electrical box 58, as previously described above for the first embodiment of the present invention.

Face plate 210 and mounting bracket 220 can be provided with a lip/groove member and outer flange member, respectively, which are similar in construction and operation to the lip and flange members described for the first embodiment of the present invention. Additionally, the other features of light switch cover 200, not discussed, are similar to those discussed above for the first embodiment of the present invention.

Similar to the second embodiment of the present invention, a light switch cover assembly, including an electroluminescent lighting sheet can also be utilized where more than one rocker switch is provided. Where more than one rocker switch is provided, the lighting sheet is larger in width as compared to lighting sheet 240 and the length of its width is dependent on the number of rocker switches provided. Additionally, a diverter bar, as described above, is provided. Also, the safety attachment of a mounting bracket outer flange and flange groove member, as described above, can also be provided for all of the embodiments of the present invention. Furthermore, where an attachment sheet is utilized, the attachment sheet is larger in width than attachment sheet 260 and the length of its width is dependent on the number of rocker switches provided.

Wires 242 can be connected to switch box 56, by conventional means, so that when rocker switch 46 is in an "off" position, lighting sheet 240 is illuminated and when rocker switch 46 is in an "on" position, lighting sheet 240 is off. Lighting sheet 240 can have a useful life of one hundred thousand (100,000) hours and can be wired to 110 Volts AC.

In all of the embodiments, the present invention provides a light switch cover which, in addition to providing for a safety device, also allows a user to utilize the covered light switch. Furthermore, the present invention allows an individual to continue to use a covered light switch, without having to have the light switch itself exposed and part of the design. Preferably, the present invention is installed by a certified electrician for safety purposes, or at least by a competent individual who carefully follows installation instructions. In all embodiments of the present invention, no modification of how the rocker switch is attached to the electrical box is necessary. The mounting bracket, for all embodiments, is attached to the rocker switch, normally where a conventional plate member is attached.

It should also be understood, that the present invention can be utilized with other receptacles and light switches, such as plug receptacles, in addition to its preferred use with "rocker" type switches.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cover assembly for a plurality of "rocker" type light switches, comprising:
   a face plate member having an outer surface and an inner surface, said face plate member constructed from a flexible material; and
   means for attaching said face plate member so that it completely covers the light switches;
   wherein the light switches are still operable when said face plate member is properly attached to cover the light switches;
   a mounting bracket member, said mounting bracket member having at least one aperture for receipt therethrough of a portion of each of said light switches;
   wherein the plurality of rocker switches are provided and said at least one aperture comprises a plurality of apertures, each of said apertures being associated with a corresponding one of the rocker switches;
   wherein said mounting bracket further includes a diverter bar disposed between each adjacent pair of said apertures of said mounting bracket.

2. The cover assembly of claim 1 wherein said face plate has indicia disposed on its outer surface.

3. The cover assembly of claim 1 wherein said means for attaching is at least one female receiving port attached to the inner surface of said face plate member and at least one protruding peg member attached to the outer surface of said mounting bracket; each of said at least one receiving port associated with a respective protruding peg member, wherein a portion of said peg member is received within its respective receiving port when said cover plate member is properly attached to said mounting bracket.

4. The cover assembly of claim 1, wherein said lighting sheet is wired to at least one of said light switches.

5. The cover assembly of claim 4, wherein said lighting sheet is wired to said at least one of the light switches such that when said at least one of the light switches is in an "off" position, said lighting sheet is illuminated.

6. The cover assembly of claim 1 further including an electroluminescent lighting sheet disposed between said face plate and said mounting bracket, said electroluminescent lighting sheet electrically associated with electrical circuitry of at least one of the light switches.

7. The cover assembly of claim 6, wherein said lighting sheet is wired to said at least one of the light switches.

8. The cover assembly of claim 7, wherein said lighting sheet is wired to said at least one of the light switches such that when said at least one of the light switches is in an "off" position, said lighting sheet is illuminated.

9. A cover assembly for a "rocker" type light switch, said light switch attached to an electrical box and including electrical circuitry, comprising:
   a face plate having an outer surface and an inner surface, said face plate constructed from a flexible material, said face plate including a lip member disposed around an outer edge area of said face plate, said lip member defining a groove;
   a mounting bracket attached to the "rocker" type light switch, said mounting bracket having an opening, an operable portion of the light switch extending through said opening, said mounting bracket having an outer surface and an inner surface, said mounting bracket including a flange member disposed around an outer edge area of said mounting bracket; and
   first means for attaching said face plate to said mounting bracket so that it completely covers the light switch;
   wherein the light switch is still operable when said face plate is properly attached to said mounting bracket;
   wherein said flange member disposed within said groove to define a second means for attaching said face plate to said mounting bracket;
   an electroluminescent lighting sheet disposed between said face plate and said mounting bracket, said electroluminescent lighting sheet electrically associated with the electrical circuitry of the light switch;
   wherein said first means for attaching comprises:
      a flexible sheet member having an inner surface and an outer surface, said inner surface abutting said electroluminescent lighting sheet, said outer surface having a plurality of receiving ports disposed thereon, said flexible sheet member attached to said face plate; and
      a plurality of protruding peg members disposed on said outer surface of said mounting bracket; each of said receiving ports associated with a respective one of said peg members, a portion of said peg members being snugly received within their associated one of said receiving ports when said face plate is attached to said mounting bracket.

10. The cover assembly of claim 9 wherein said face plate has indicia disposed on its outer surface.

11. A cover assembly for a "rocker" type light switch, said light switch attached to an electrical box and including electrical circuitry, comprising:
   a face plate having an outer surface and an inner surface, said face plate constructed from a flexible material, said face plate including a lip member disposed around an outer edge area of said face plate, said lip member defining a groove;
   a mounting bracket having an opening, an operable portion of the light switch extending through said opening, said mounting bracket having an outer surface and an inner surface, said mounting bracket including a flange member disposed around an outer edge area of said mounting bracket;
   first means for attaching said face plate to said mounting bracket so that it completely covers the light switch;
   wherein the light switch is still operable when said face plate is properly attached to said mounting bracket;
   wherein said flange member is disposed within said groove to define a second means for attaching said face plate to said mounting bracket;

wherein said mounting bracket is adapted to be attached to said light switch independently of the attachment of said face plate to said mounting bracket; and an electroluminescent lighting sheet disposed between said face plate and said mounting bracket, said electroluminescent lighting sheet electrically associated with the electrical circuity of the light switch;

wherein said lighting sheet is wired to said light switch;

wherein said mounting bracket is provided with an aperture for passage of wiring running from said light switch to said lighting sheet.

12. A cover assembly for a "rocker" type light switch, said light switch attached to an electrical box and including electrical circuitry, comprising:

a face plate having an outer surface and an inner surface, said face plate constructed from a flexible material, said face plate including a lip member disposed around an outer edge area of said face plate, said lip member defining a groove;

a mounting bracket having an opening, an operable portion of the light switch extending through said opening, said mounting bracket having an outer surface and an inner surface, said mounting bracket including a flange member disposed around an outer edge area of said mounting bracket;

first means for attaching said face plate to said mounting bracket so that it completely covers the light switch;

wherein the light switch is still operable when said face plate is properly attached to said mounting bracket;

wherein said flange member is disposed within said groove to define a second means for attaching said face plate to said mounting bracket;

wherein said mounting bracket is adapted to be attached to said light switch independently of the attachment of said face plate to said mounting bracket;

an electroluminescent lighting sheet disposed between said face plate and said mounting bracket, said electroluminescent lighting sheet electrically associated with the electrical circuity of the light switch; and an attachment sheet, said lighting sheet disposed between said face plate and said attachment sheet, said attachment sheet having a first surface, said first means for attaching associated with said first surface.

13. The cover assembly of claim 12 wherein said attachment sheet is provided with an aperture for passage of wiring running from said light switch to said lighting sheet.

14. A cover assembly for a light switch, comprising:

a face plate member having an outer surface and an inner surface;

a mounting bracket member abutting a wall area surrounding the light switch, said face plate member attached to said mounting bracket; and an electroluminescent lighting sheet disposed between said face plate and said mounting bracket, said electroluminescent lighting sheet electrically associated with electrical circuitry of the light switch;

wherein said mounting bracket is provided with an aperture for passage of wiring running from said light switch to said lighting sheet.

15. A cover assembly for a plurality of light switches, comprising:

a face plate member constructed from a flexible material; and a mounting bracket member having a plurality of apertures, each of said apertures being associated with and receiving a corresponding one of said light switches, said face plate member attached to said mounting bracket member, said mounting bracket having a diverter bar disposed between each adjacent pair of said apertures of said mounting bracket.

* * * * *